United States Patent
Ramachandran et al.

(10) Patent No.: US 8,976,740 B2
(45) Date of Patent: Mar. 10, 2015

(54) SYSTEM INFORMATION ACQUISITION IN CONNECTED MODE

(75) Inventors: Vivek V. Ramachandran, Redmond, WA (US); Vanitha A. Kumar, San Diego, CA (US); Amit Mahajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1185 days.

(21) Appl. No.: 12/614,339

(22) Filed: Nov. 6, 2009

(65) Prior Publication Data

US 2011/0110327 A1 May 12, 2011

(51) Int. Cl.
  *H04W 4/00* (2009.01)
  *H04W 8/20* (2009.01)
  *H04W 76/04* (2009.01)

(52) U.S. Cl.
  CPC ............ *H04W 8/205* (2013.01); *H04W 76/046* (2013.01)
  USPC .......................................... 370/329; 455/450

(58) Field of Classification Search
  CPC ..... H04W 36/08; H04W 36/16; H04W 36/24; H04W 36/34
  USPC .......... 370/328, 329, 331, 335; 455/436–443, 455/450
  See application file for complete search history.

(56) References Cited

U.S. PATENT DOCUMENTS

| 2005/0249140 | A1 | 11/2005 | Lee et al. |
| 2009/0274086 | A1* | 11/2009 | Petrovic et al. ............... 370/312 |
| 2011/0026484 | A1* | 2/2011 | Fox et al. ...................... 370/331 |

FOREIGN PATENT DOCUMENTS

| CN | 1943146 A | 4/2007 | |
| CN | 101005711 A | 7/2007 | |
| CN | 101557617 A | 10/2009 | |
| EP | 1909523 A1 * | 4/2008 | ............... H04Q 7/38 |
| JP | 2010506446 A | 2/2010 | |
| WO | 2008040447 A1 | 4/2008 | |
| WO | 2008040448 A1 | 4/2008 | |

OTHER PUBLICATIONS

"Method for Shortening timedelay of user's terminal from connecting mode returning to idle mode", CN101005711, 2007.*
Taiwan Search Report—TW099138152—TIPO—Jun. 30, 2013.
(Continued)

*Primary Examiner* — Habte Mered
(74) *Attorney, Agent, or Firm* — Larry Moskowitz

(57) ABSTRACT

A method of wireless communication includes acquiring at least one non-required system information from a cell while in a radio resource control connected state. The non-required system information is system information that is not required in the radio resource control connected state. The method includes transitioning from the radio resource control connected state to a radio resource control idle state on the cell without acquiring the at least one non-required system information.

40 Claims, 11 Drawing Sheets

(56) References Cited

OTHER PUBLICATIONS

3GPP: "3rd Generation Partnership Project, Technical Specification Group Radio Access Network, Evolved Universal Terrestrial Radio Access (E-UTRA), Radio Resource Control (RRC), Protocol specification (Release 9)", 3GPP TS 36.331 V9.0.0, Sep. 29, 2009, pp. 1-30, XP002616949, Retrieved from the Internet: URL:http://www.3gpp.org/ftp/Specs/html-inf 0/36331.htm.

International Search Report and Written Opinion—PCT/US2010/055493, International Search Authority—European Patent Office—Mar. 11, 2011.

Taiwan Search Report—TW099138152—TIPO—May 27, 2014.

* cited by examiner

SYSTEM INFORMATION ACQUISITION IN CONNECTED MODE

BACKGROUND

1. Field

The present disclosure relates generally to communication systems, and more particularly, to system information acquisition in a connected mode.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In LTE, the user equipment (UE) applies the system information acquisition procedure to acquire the access stratum (AS) and non-access stratum (NAS) system information that is broadcasted by the Evolved Universal Terrestrial Radio Access Network (E-UTRAN). The procedure applies to UEs in the RRC_IDLE state and UEs in the RRC_CONNECTED state. When a UE is in the RRC_CONNECTED state, the UE must ensure that it has a valid version of the MasterInformationBlock (MIB), SystemInformationBlockType1 (SIB1), SystemInformationBlockType2 (SIB2), and SystemInformationBlockType8 (SIB8) when CDMA2000 is supported. This minimal set of system information is sufficient for the UE to stay on the cell in the RRC_CONNECTED state. When the UE is in the RRC_IDLE state, the UE needs to ensure that it has a valid version of the MIB, SIB1 , SIB2, and SystemInformationBlockType3 (SIB3) through SystemInformationBlockType8 (SIB8). Acquiring the requisite system information for the RRC_IDLE state at the time of transitioning on the same cell from the RRC_CONNECTED state to the RRC_IDLE state can potentially cause an unnecessary delay that could lead to call failures and missed pages, as well as an increased likelihood of going out of service. As such, there is a need for an apparatus and a method for reducing the delay due to system information acquisition during a transition on the same cell between the RRC_CONNECTED state and the RRC_IDLE state.

SUMMARY

In an aspect of the disclosure, a method of wireless communication includes acquiring at least one non-required system information from a cell while in a radio resource control connected state. The non-required system information is system information that is not required in the radio resource control connected state. The method includes transitioning from the radio resource control connected state to a radio resource control idle state on the cell without acquiring the at least one non-required system information.

In an aspect of the disclosure, an apparatus for wireless communication includes means for acquiring at least one non-required system information from a cell while in a radio resource control connected state. The non-required system information is system information that is not required in the radio resource control connected state. The apparatus further includes means for transitioning from the radio resource control connected state to a radio resource control idle state on the cell without acquiring the at least one non-required system information In an aspect of the disclosure, a computer program product includes a computer-readable medium. The computer-readable medium includes code for acquiring at least one non-required system information from a cell while in a radio resource control connected state. The non-required system information is system information that is not required in the radio resource control connected state. The computer-readable medium further includes code for transitioning from the radio resource control connected state to a radio resource control idle state on the cell without acquiring the at least one non-required system information.

In an aspect of the disclosure, an apparatus for wireless communication includes a processing system. The processing system is configured to acquire at least one non-required system information from a cell while in a radio resource control connected state. The non-required system information is system information that is not required in the radio resource control connected state. The processing system is further configured to transition from the radio resource control connected state to a radio resource control idle state on the cell without acquiring the at least one non-required system information.

DETAILED DESCRIPTION

Figure 1:
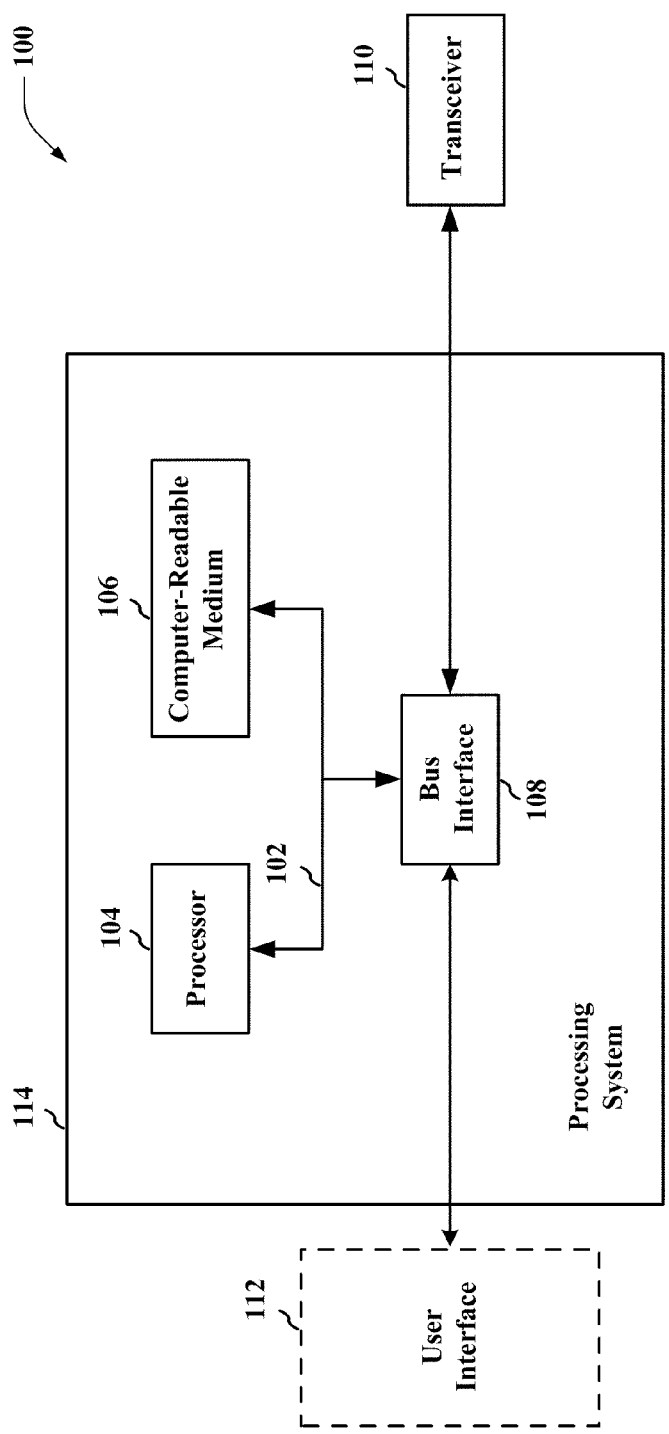
FIG. 1 is a conceptual diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, cause the processing system 114 to perform the various functions described infra for any particular apparatus. The computer-readable medium 106 may also be used for storing data that is manipulated by the processor 104 when executing software.

Figure 2:
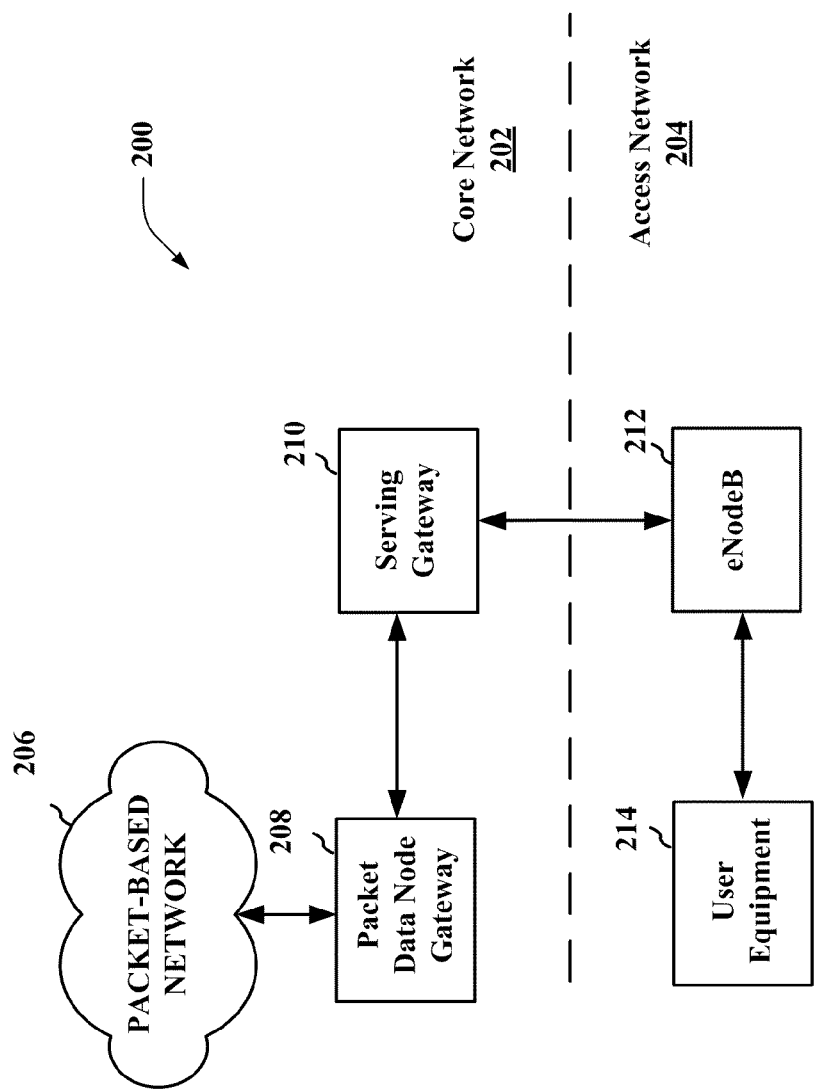
FIG. 2 is a conceptual diagram illustrating an example of a network architecture.

An example of a telecommunications system employing various apparatus will now be presented with reference to an LTE network architecture as shown in FIG. 2. The LTE network architecture 200 is shown with a core network 202 and an access network 204. In this example, the core network 202 provides packet-switched services to the access network 204, however, as those skilled in the art will readily appreciate, the various concepts presented throughout this disclosure may be extended to core networks providing circuit-switched services.

The access network 204 is shown with a single apparatus 212, which is commonly referred to as an evolved NodeB in LTE applications, but may also be referred to by those skilled in the art as a base station, a base transceiver station, a radio base station, a radio transceiver, a transceiver function, a basic service set (BSS), an extended service set (ESS), or some other suitable terminology. The eNodeB 212 provides an access point to the core network 202 for a mobile apparatus 214. Examples of a mobile apparatus include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The mobile apparatus 214 is commonly referred to as user equipment (UE) in LTE applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The core network 202 is shown with several apparatus including a packet data node (PDN) gateway 208 and a serving gateway 210. The PDN gateway 210 provides a connection for the access network 204 to a packet-based network 206. In this example, the packet-based network 206 is the Internet, but the concepts presented throughout this disclosure are not limited to Internet applications. The primary function of the PDN gateway 208 is to provide the UE 214 with network connectivity. Data packets are transferred between the PDN gateway 208 and the UE 214 through the serving gateway 210, which serves as the local mobility anchor as the UE 214 roams through the access network 204.

Figure 3:
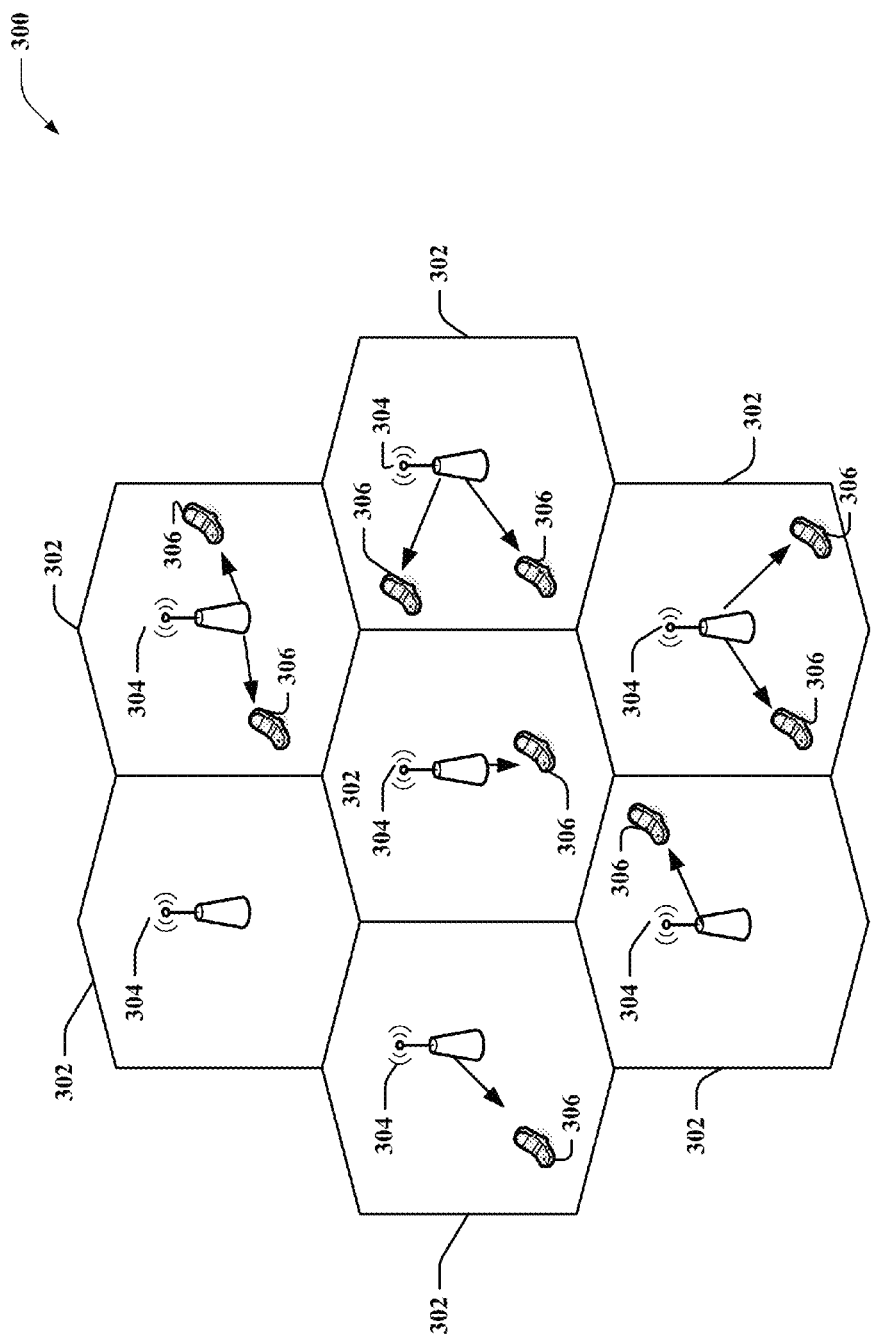
FIG. 3 is a conceptual diagram illustrating an example of an access network.

An example of an access network in an LTE network architecture will now be presented with reference to FIG. 3. In this example, the access network 300 is divided into a number of cellular regions (cells) 302. An eNodeB 304 is assigned to a cell 302 and is configured to provide an access point to a core network 202 (see FIG. 2) for all the UEs 306 in the cell 302. There is no centralized controller in this example of an access network 300, but a centralized controller may be used in alternative configurations. The eNodeB 304 is responsible for all radio related functions including radio bearer control, admission control, mobility control, scheduling, security, and connectivity to the serving gateway 210 in the core network 202 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeB 304 may have multiple antennas supporting MIMO technology. The use of MIMO technology enables the eNodeB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more the data streams destined for that UE 306. On the uplink, each UE 306 transmits a spatially precoded data stream, which enables the eNodeB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
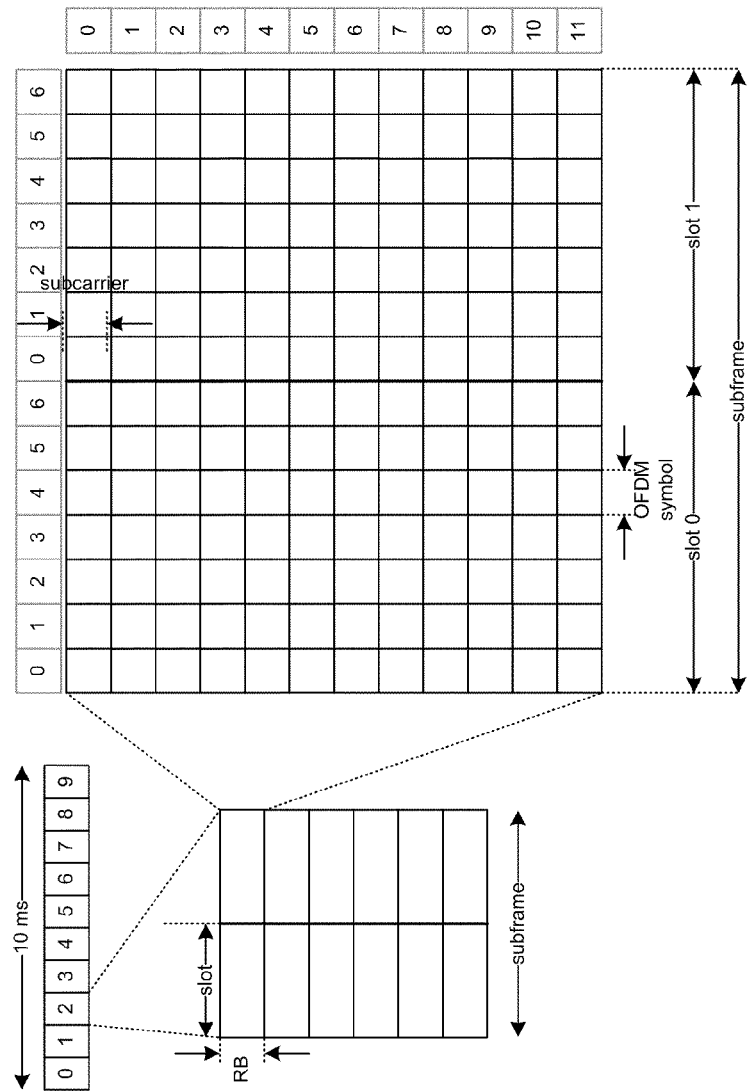
FIG. 4 is a conceptual diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. The number of bits carried by each resource element depends on the modulation scheme. Thus, the more resource blocks that a UE receives and the higher the modulation scheme, the higher the data rate for the UE.

Figure 5:
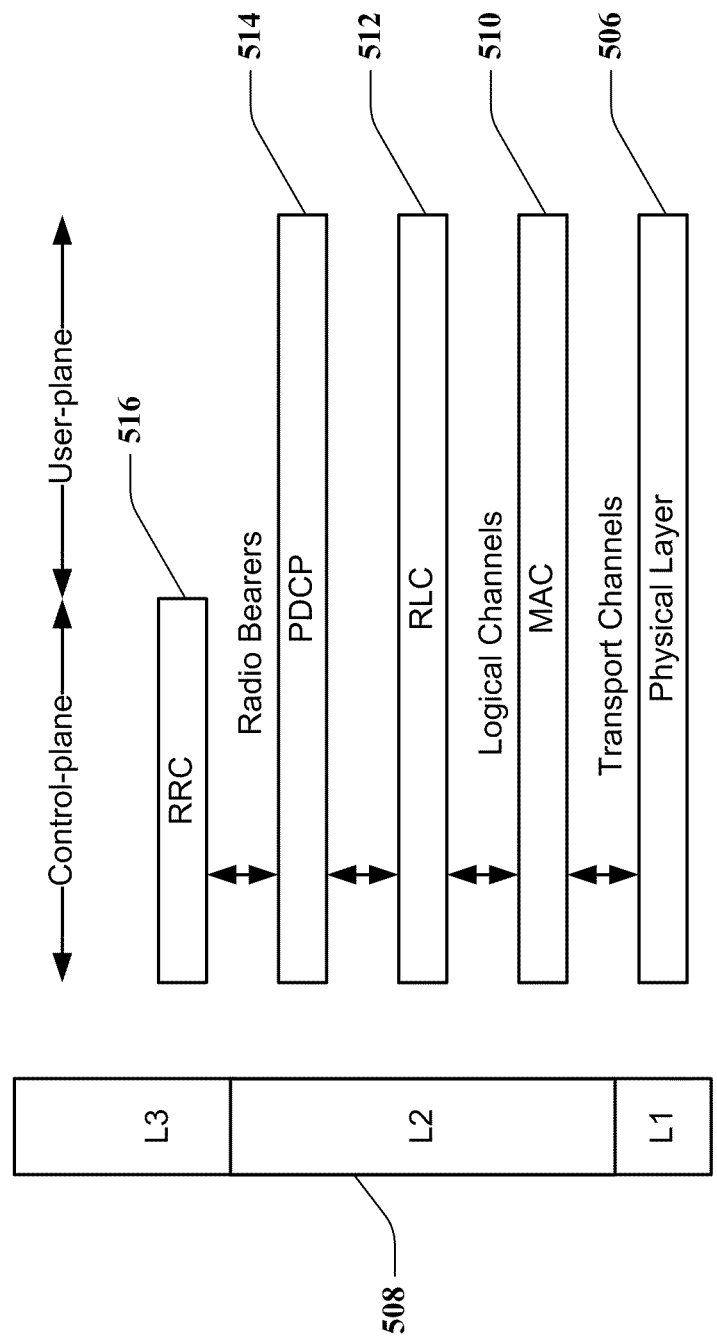
FIG. 5 is a conceptual diagram illustrating an example of a radio protocol architecture for the user and control plane.

The radio protocol architecture may take on various forms depending on the particular application. An example for an LTE system will now be presented with reference to FIG. 5. FIG. 5 is a conceptual diagram illustrating an example of the radio protocol architecture for the user and control planes.

Turning to FIG. 5, the radio protocol architecture for the UE and eNodeB is shown with three layers: Layer 1, Layer 2, and Layer 3. Layer 1 is the lowest lower and implements various physical layer signal processing functions. Layer 1 will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control pane, the radio protocol architecture for the UE and eNodeB is substantially the same for the physical layer 506 and the L2 layer 508 with the exception that there is no header compression function for the control plane. The control pane also includes a radio resource control (RRC) sublayer 516 in Layer 3. The RRC sublayer 516 is responsible for obtaining radio resources (i.e., radio bearers) and for configuring the lower layers using RRC signaling between the eNodeB and the UE.

Figure 6:
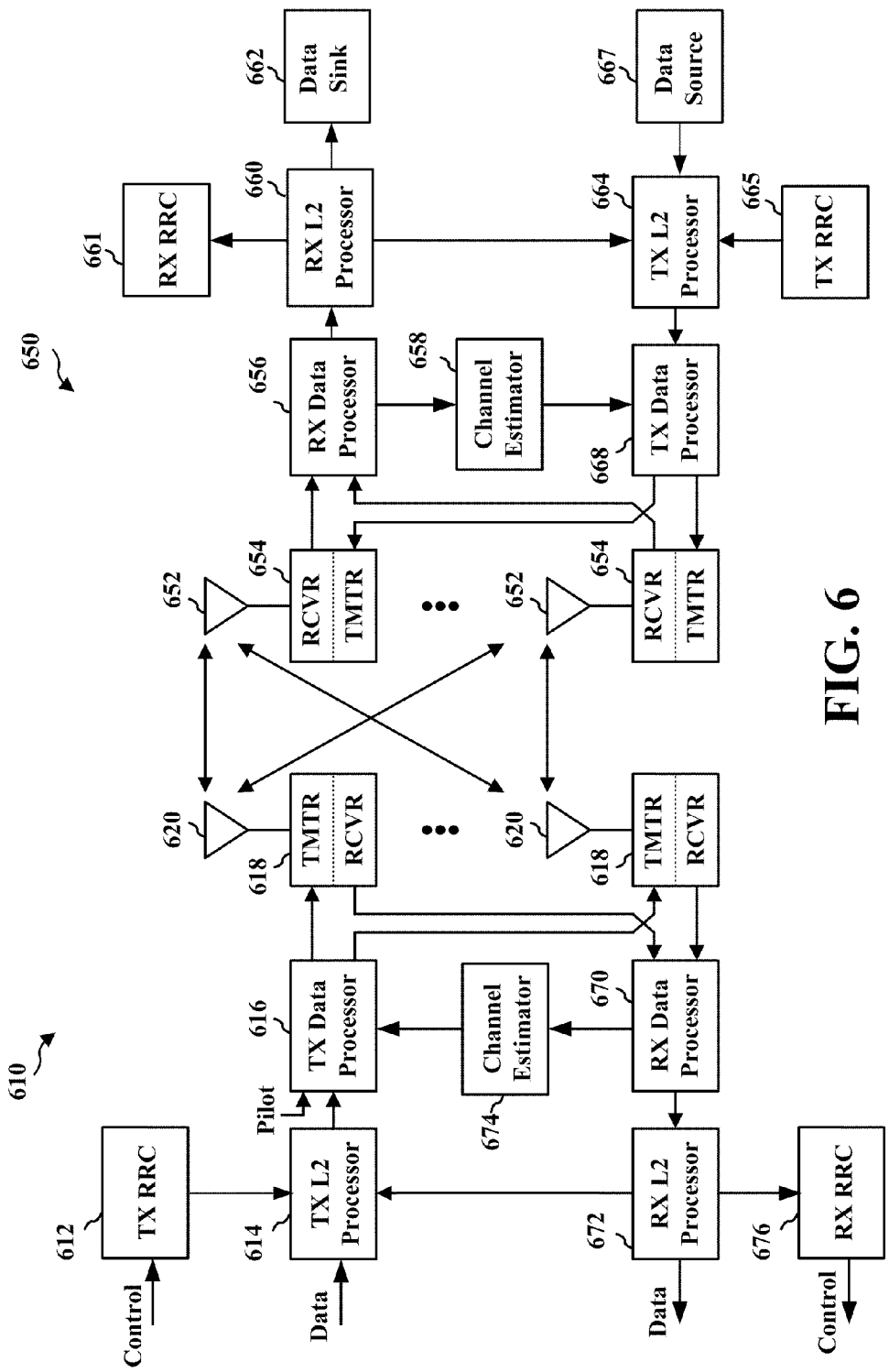
FIG. 6 is a conceptual diagram illustrating an example of an eNodeB and a UE in an access network.

FIG. 6 is a block diagram of a eNodeB in communication with a UE in an access network. In the DL, upper layer packets from the core network are provided to a transmit (TX) L2 processor 614. The TX L2 processor 614 implements the functionality of the L2 layer described earlier in connection with FIG. 5A and FIG. 5B. More specifically, the TX L2 processor 614 compresses the headers of the upper layer packets, ciphers the packets, segments the ciphered packets, reorders the segmented packets, multiplexes the data packets between logical and transport channels, and allocates radio resources to the UE 650 based on various priority metrics. The TX L2 processor 614 is also responsible for HARQ operations, retransmission of lost packets, and signaling to the UE 650 based on controls from the TX radio resource controller 612.

The TX data processor 616 implements various signal processing functions for the physical layer. The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) data processor 656.

The RX data processor 656 implements various signal processing functions of the physical layer. The RX data processor 656 performs spatial processing on the information to recover any spatial streams destined for the UE 650. If multiple spatial streams are destined for the UE 650, they may be combined by the RX data processor 656 into a single OFDM symbol stream. The RX data processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to a RX L2 processor 660.

The RX L2 processor 660 implements the functionality of the L2 layer described earlier in connection with FIG. 5A and FIG. 5B. More specifically, the RX L2 processor 660 provides demultiplexing between transport and logical channels, reassembles the data packets into upper layer packets, deciphers the upper layer packets, decompresses the headers and processes the control signals. The upper layer packets are then provided to a data sink 662, which represents all the protocol layers above the L2 layer. The RX L2 processor 660 is also responsible for error detection using an acknowledgement (ACK) and/or negative acknowledgement (NACK) protocol to support HARQ operations. The control signals are provided to a RX radio resource controller 661.

In the UL, a data source 667 is used to provide data packets to a transmit (TX) L2 processor 664. The data source 667 represents all protocol layers above the L2 layer (L2). Similar to the functionality described in connection with the DL transmission by the eNodeB 610, the TX L2 processor 664 implements the L2 layer for the user plane and the control plane. The latter is in response to a TX radio resource controller 665. The TX data processor 668 implements the physical layer. Channel estimates derived by a channel estimator 558 from a reference signal or feedback transmitted by the eNodeB 610 may be used by the TX data processor 668 to select the appropriate coding and modulation schemes, and to facilitate spatial processing. The spatial streams generated by the TX data processor 668 are provided to different antenna 652 via separate transmitters 654TX. Each transmitter 654TX modulates an RF carrier with a respective spatial stream for transmission.

The UL transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX data processor 670. The RX data processor 670 implements the physical layer and the RX L2 processor 672 implements the L2 layer. Upper layer packets from the RX L2 processor may be provided to the core network and control signals may be provided to a RX radio resource controller 676.

Figure 7:
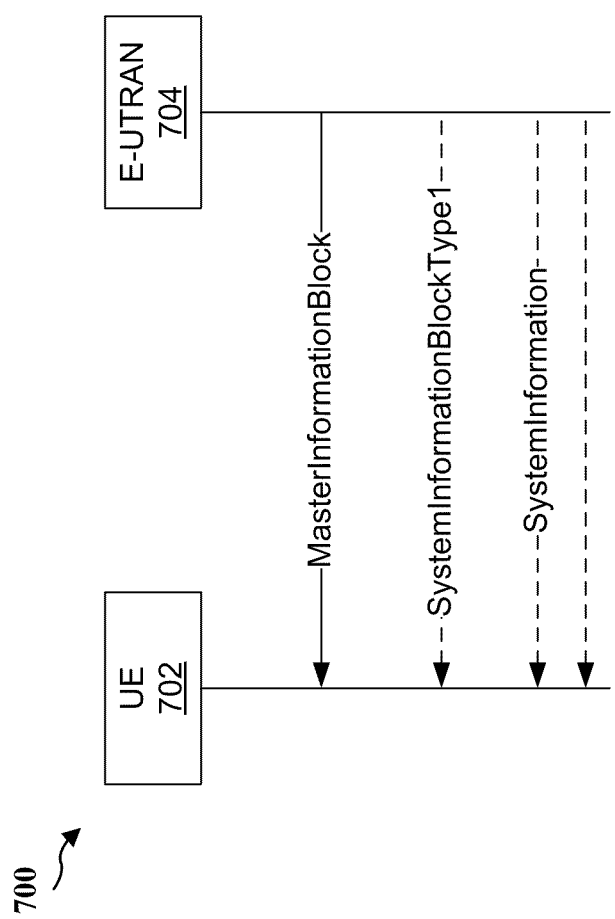
FIG. 7 is a diagram illustrating system information acquisition in the radio resource control layer.

FIG. 7 is a diagram 700 illustrating system information acquisition by the RX radio resource controller 661 in the RRC layer 516. In LTE, the UE 702 acquires the AS and NAS system information that is broadcasted by the E-UTRAN 704 through the system information acquisition procedure. The procedure applies to UEs in the RRC_IDLE state following (1) cell selection upon power on, upon return from out of coverage, and after entering E-UTRA from another radio access technology (RAT); (2) cell reselection; (3) notification that the system information has changed; and (4) expiry of the maximum validity duration. The procedure applies to UEs in the RRC_CONNECTED state following (1) handover completion; (2) cell selection (recovery after radio link failure before T311 expiry); and (3) notification that the system information has changed.

Figure 8:
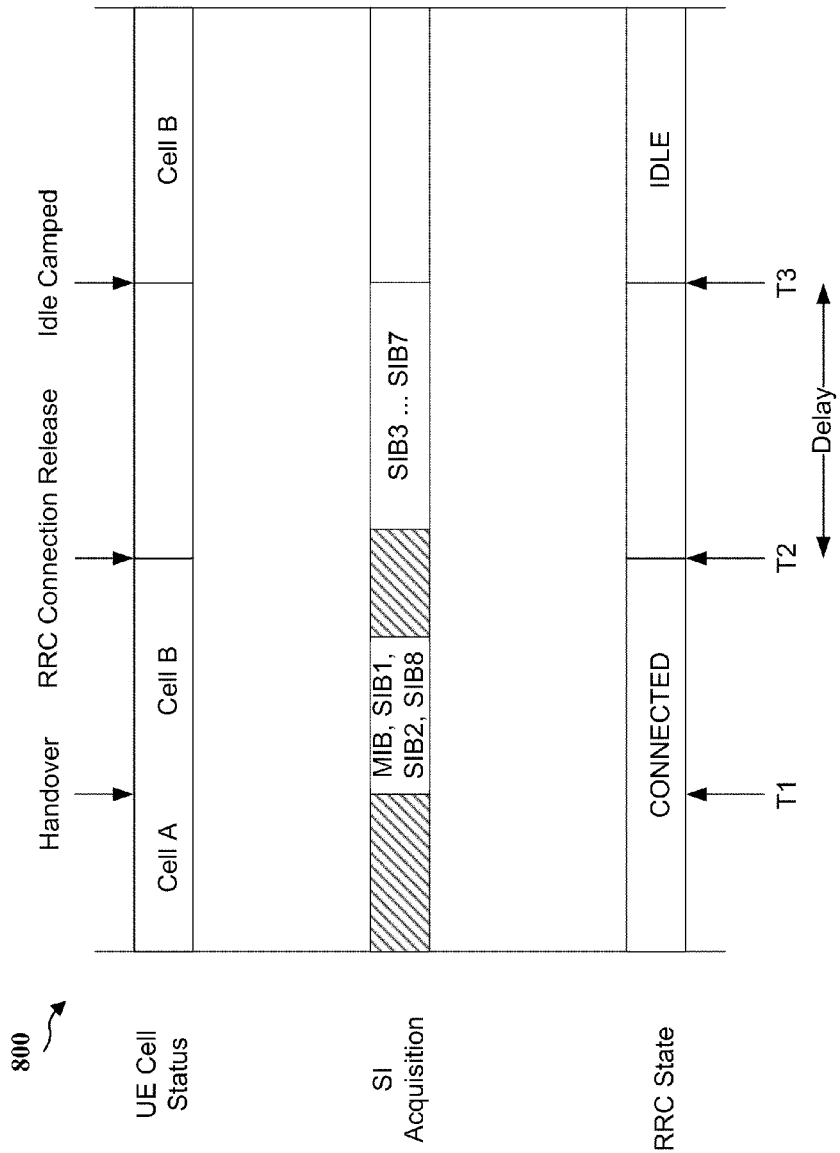
FIG. 8 is a diagram illustrating a potential delay when a UE transitions from the RRC_CONNECTED state to the RRC_IDLE state on the same cell.

As shown in FIG. 7, the system information is sent in multiple system information messages by the E-UTRAN 704. Table 1 below lists the system information messages in LTE:

FIG. 8 is a diagram 800 illustrating a potential delay when the UE 702 transitions from the RRC_CONNECTED state to the RRC_IDLE state on the same cell. When the UE 702 is in the RRC_CONNECTED state and needs to acquire the system information (due to a successful completion of handover, system information change, or radio link failure (RLF) recovery), the UE 702 is required to collect only the MIB, SIB1, SIB2, and SIB8 (assuming CDMA2000 is supported). This minimal set of "required" system information is sufficient for the UE 702 to stay on the cell in the RRC_CONNECTED state. However, when the UE transitions from the RRC_CONNECTED state to the RRC_IDLE state on the same cell, the UE needs to acquire the non-required system information SIB3 through SIB7 to satisfy the minimal system information requirements in the RRC_IDLE state. The acquisition of the

TABLE 1

System Information Messages

| Message | Message Type | Periodicity | Contents |
|---|---|---|---|
| Master Information Block (MIB) | BCCH-BCH | Periodicity of 40 ms, repetitions every 10 ms | SFN, System Bandwidth, PHICH Configuration |
| System Information Block Type 1 (SIB1) | BCCH-DL-SCH | Periodicity of 80 ms, repeated every 20 ms | PLMN Id, Cell Id, Tracking Area code, Cell Selection parameters, Cell bar info, SIB schedule |
| System Information Block Type 2 (SIB2) | BCCH-DL-SCH | Specified in SIB1. [80, 160, 320, 640, 1280, 2560, 5120 ms] | Access info, common/shared channel information, UL frequency information |
| System Information Block Type 3 (SIB3) | BCCH-DL-SCH | Specified in SIB1. [80, 160, 320, 640, 1280, 2560, 5120 ms] | Cell reselection parameters |
| System Information Block Type 4 (SIB4) | BCCH-DL-SCH | Specified in SIB1. [80, 160, 320, 640, 1280, 2560, 5120 ms] | LTE Intra-frequency Neighbor information |
| System Information Block Type 5 (SIB5) | BCCH-DL-SCH | Specified in SIB1. [80, 160, 320, 640, 1280, 2560, 5120 ms] | LTE Inter-frequency Neighbor information |
| System Information Block Type 6 (SIB6) | BCCH-DL-SCH | Specified in SIB1. [80, 160, 320, 640, 1280, 2560, 5120 ms] | WCDMA neighbor information |
| System Information Block Type 7 (SIB7) | BCCH-DL-SCH | Specified in SIB1. [80, 160, 320, 640, 1280, 2560, 5120 ms] | GSM neighbor information |
| System Information Block Type 8 (SIB8) | BCCH-DL-SCH | Specified in SIB1. [80, 160, 320, 640, 1280, 2560, 5120 ms] | CDMA 2000 neighbor information |
| System Information Block Type 9 (SIB9) | BCCH-DL-SCH | Specified in SIB1. [80, 160, 320, 640, 1280, 2560, 5120 ms] | home eNB name (HNB Name) |
| System Information Block Type 10 (SIB10) | BCCH-DL-SCH | Specified in SIB1. [80, 160, 320, 640, 1280, 2560, 5120 ms] | (Earthquake and Tsunami Warning System) ETWS primary notification |
| System Information Block Type 11 (SIB11) | BCCH-DL-SCH | Specified in SIB1. [80, 160, 320, 640, 1280, 2560, 5120 ms] | ETWS secondary notification |
| System Information Block Type 12 (SIB12) | BCCH-DL-SCH | Specified in SIB1. [80, 160, 320, 640, 1280, 2560, 5120 ms] | Commercial Mobile Alert Service (CMAS) notification |

When the UE 702 is in the RRC_IDLE state, the UE 702 must ensure that it has a valid version of the MIB, SIB1, and SIB2 through SIB8 depending on support of the concerned RATs. Specifically, when in the RRC_IDLE state, the UE 702 must acquire the MIB, SIB1 through SIB5, SIB6 when WCDMA is supported, SIB7 when GSM is supported, and SIB8 when CDMA2000 is supported. When the UE 702 is in the RRC_CONNECTED state, the UE 702 must ensure that it has a valid version of the MIB, SIB1, SIB2, and SIB8 if CDMA2000 is supported.

system information SIB3 through SIB7 during the transition could add an unnecessary delay in the process of the UE 702 transitioning to the RRC_IDLE state as depicted in FIG. 7. Before T1, the UE 702 is camped on cell A. At T1, the UE 702 completes a successful handover from cell A to cell B. The UE 702 initiates and collects MIB, SIB1, SIB2, and SIB8 on cell B. The UE acquires and stores these information blocks. At T2, the RRC connection is released, and the UE 702 tries to transition to the RRC_IDLE state on cell B. The UE 702 acquires SIB3 through SIB7 on cell B by T3. The UE 702 successfully transitions to the RRC_IDLE state camped status at T3. The time period to acquire SIB3 through SIB7 (i.e., the time period between T2 and T3) causes a delay in the transition between the RRC_CONNECTED and RRC_IDLE states. Depending on the system information scheduling, this interruption can be as long as a few seconds, which could potentially lead to delayed call setups, missed pages, and as discussed infra, an increased likelihood of going out of service. As such, the delay may decrease the reliability of the UE 702.

Figure 9:
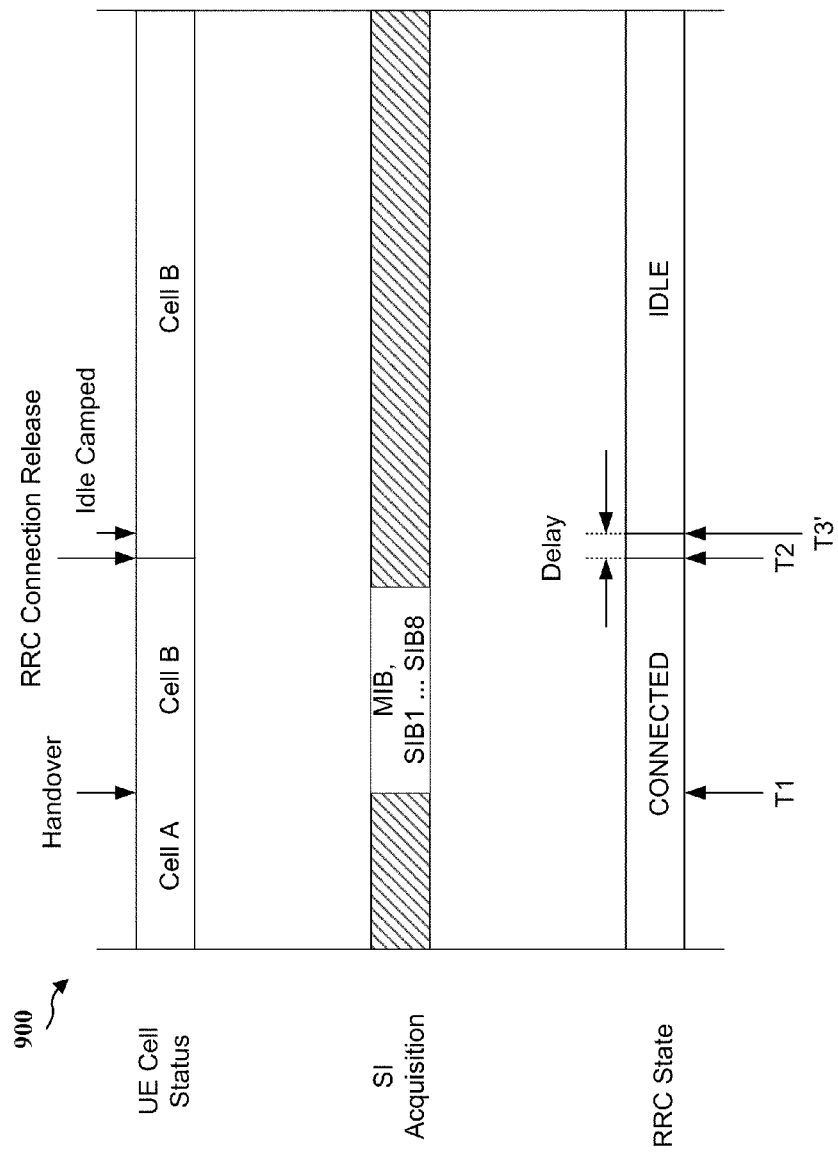
FIG. 9 is a diagram illustrating an exemplary method to address the delay discussed in relation to FIG. 8.

FIG. 9 is a diagram 900 illustrating an exemplary method to address the delay discussed in relation to FIG. 8. As shown in FIG. 9, before T1, the UE 702 is camped on cell A. At T1, the UE 702 completes a successful handover from cell A to cell B. The UE 702 initiates and collects the required system information MIB, SIB1, SIB2, and SIB8 on cell B. In addition, the UE 702 initiates and collects the non-required system information SIB3 through SIB7 on cell B. The UE acquires and stores these information blocks. At T2, the RRC connection is released, and the UE 702 tries to transition to the RRC_IDLE state on cell B. Because the UE 702 already has all of the requisite system information for the RRC_IDLE state, the UE 702 successfully transitions to the RRC_IDLE state camped status at T3'. In this case, the delay (difference between T3' and T2) is substantially reduced (i.e., minimized with respect to the delay introduced by having to acquire the non-required system information). Accordingly, the exemplary method eliminates an unnecessary delay in transitioning between the RRC_CONNECTED and RRC_IDLE states for the same cell, thus resulting in better UE performance with respect to call setup failures, missed pages, and a decreased likelihood of going out of service.

Figure 10:
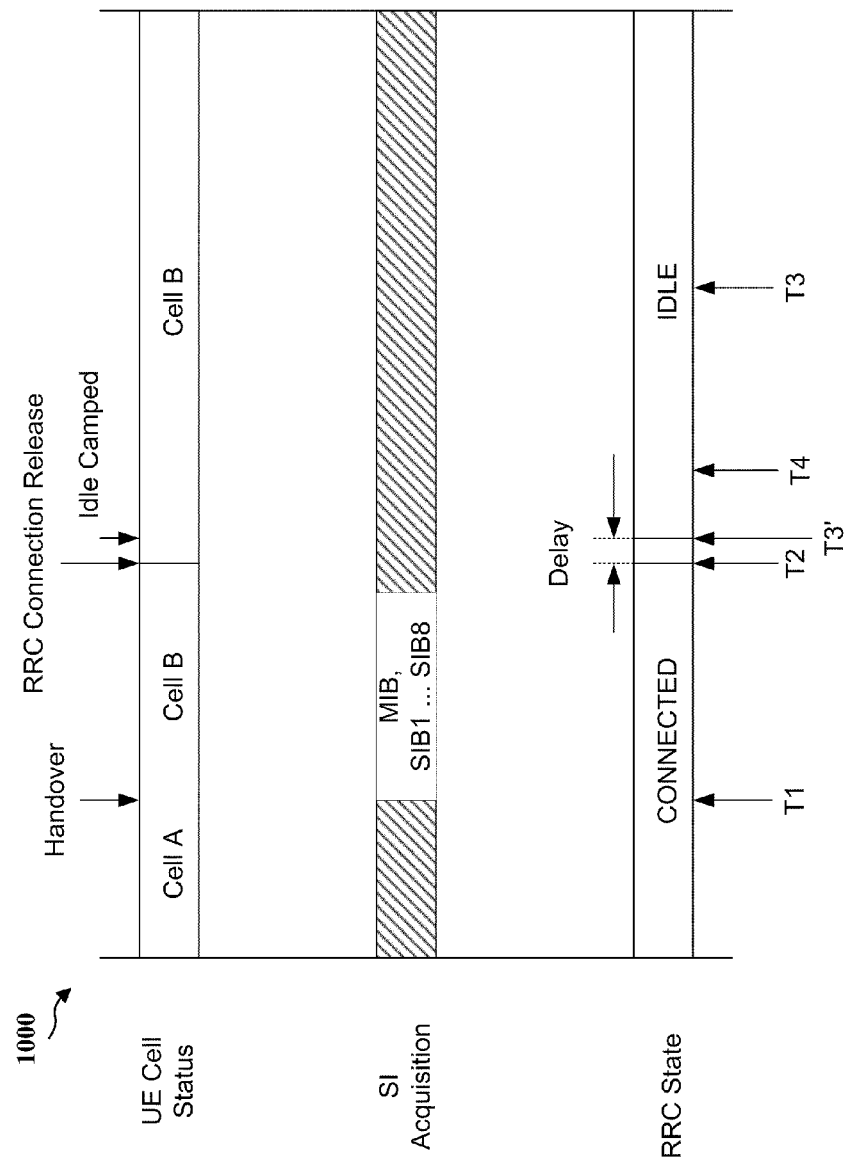
FIG. 10 is a diagram illustrating an exemplary method with respect to cell reselection.

FIG. 10 is a diagram 1000 illustrating an exemplary method with respect to cell reselection. The acquisition by the UE of the non-required system information while in the RRC_ CONNECTED state facilitates UE recovery from radio link failure during the RRC_CONNECTED state. In addition, the acquisition of the non-required system information while in the RRC_CONNECTED state reduces (or minimizes) a likelihood of going out of service through cell reselection while in the RRC_IDLE state. As shown in FIG. 10, the UE acquires the required and non-required system information while in the RRC_CONNECTED state, and if a UE is close to going out of service at T4, the UE can perform cell reselection while in the RRC_IDLE state to minimize or otherwise reduce the likelihood of going out of service. The UE is able to perform the cell reselection at T4 because the UE already has the non-required system information the UE needs to perform the cell reselection. Had the UE not obtained the non-required system information during the RRC_CONNECTED state, the UE would not have been able to perform the cell reselection until after T3 as discussed in relation to FIG. 8. The cell reselection may be intra frequency reselection to a different frequency on a same carrier of the cell, inter frequency reselection to a different carrier on the cell, or inter RAT reselection to a different cell. If the cell reselection is intra frequency reselection, the cell reselection is performed based on the system information type block 3 and the system information type block 4 as shown in Table 1. If the cell reselection is inter frequency reselection, the cell reselection is performed based on the system information type block 3 and the system information type block 5 as shown in Table 1. If the cell reselection is inter RAT, the cell reselection is performed based on the system information type block 3 and at least one of the system information type block 6 and the system information block type 7 as shown in Table 1.

Figure 11:
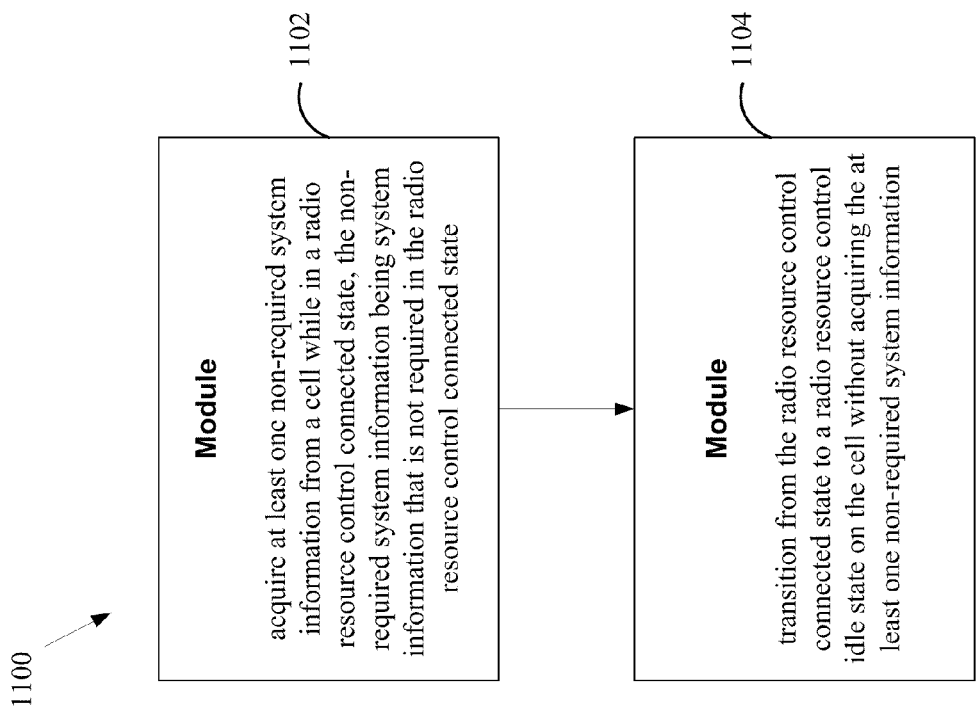
FIG. 11 is a conceptual block diagram illustrating the functionality of an exemplary apparatus.

FIG. 11 is a conceptual block diagram 1100 illustrating the functionality of an exemplary UE apparatus 100. The apparatus 100 includes a module 1102 that acquires at least one non-required system information from a cell while in a radio resource control connected state. The non-required system information is system information that is not required in the radio resource control connected state. The apparatus 100 further includes a module 1104 that transitions from the radio resource control connected state to a radio resource control idle state on the cell without acquiring the at least one non-required system information. In one configuration, the acquisition of the at least one non-required system information minimizes or reduces a transition period of the transitioning from the RRC connected state to the RRC idle state. In one configuration, the apparatus 100 uses the at least one non-required system information in order to minimize or otherwise reduce a likelihood of going out of service through cell reselection based on the at least one non-required system information. The cell reselection is performed after the transition to the RRC idle state. The cell reselection may be intra frequency reselection, inter frequency reselection, or inter RAT reselection. In one configuration, the RRC connected state is the RRC_CONNECTED state and the RRC idle state is the RRC_IDLE state. The "required" system information includes MIB, SIB1, SIB2, and SIB8 if CDMA2000 is supported. The "non-required" system information includes SIB3 through SIB7, and a system information block type 9 (i.e., SystemInformationBlockType9), but may include additional SIBs.

In one configuration, the apparatus 100 for wireless communication includes means for acquiring at least one non-required system information from a cell while in a radio resource control connected state. The non-required system information is system information that is not required in the radio resource control connected state. In addition, the apparatus 100 includes means for transitioning from the radio resource control connected state to a radio resource control idle state on the cell without acquiring the at least one non-required system information. The aforementioned means is the processing system 114 configured to perform the functions recited by the aforementioned means.

As described supra, an exemplary method and apparatus acquires non-required system information in the RRC connected state and transitions from the RRC connected state to the RRC idle state without acquiring the previously acquired non-required system information. The exemplary method allows the exemplary apparatus to reduce a transition period between the RRC connected and idle states. In addition, the exemplary method allows the exemplary apparatus to reduce a likelihood of going out of service through cell reselection (in the RRC idle state) based on the non-required system information obtained during the RRC connected state.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
acquiring at least one non-required system information from a first eNodeB while in a radio resource control connected state after handover from a second eNodeB to the first eNodeB, the non-required system information being system information that is not required in the radio resource control connected state, but that is required in a radio resource control idle state; and
during a transition period, transitioning from the radio resource control connected state to the radio resource control idle state without acquiring the at least one non-required system information, wherein the transition period is between release of the radio resource control connection state and successful transition to radio resource control idle state camped status.

2. The method of claim 1, wherein the acquiring of the at least one non-required system information minimizes the transition period.

3. The method of claim 1, further comprising using the at least one non-required system information.

4. The method of claim 3, wherein the using the at least one non-required system information comprises minimizing a likelihood of going out of service through cell reselection based on the at least one non-required system information.

5. The method of claim 4, wherein the cell reselection is an intra frequency reselection to a different frequency on a same carrier on the cell, the non-required system information comprising a system information type block 3 and a system information type block 4.

6. The method of claim 4, wherein the cell reselection is an inter frequency reselection to a different carrier on the cell, the non-required system information comprising a system information type block 3 and a system information block type 5.

7. The method of claim 4, wherein the cell reselection is inter radio access technology reselection to a different cell, the non-required system information comprising a system information type block 3, a system information block type 6, and a system information block type 7.

8. The method of claim 1, wherein the radio resource control connected state is an RRC_CONNECTED state and the radio resource control idle state is an RRC_IDLE state.

9. The method of claim 1, wherein the non-required system information comprises a system information block type 3, a system information block type 4, a system information block type 5, a system information block type 6, a system information block type 7, and a system information block type 9.

10. The method of claim 9, wherein:
the system information block type 3 is a SystemInformationBlockType3,
the system information block type 4 is a SystemInformationBlockType4,
the system information block type 5 is a SystemInformationBlockType5,
the system information block type 6 is a SystemInformationBlockType6,
the system information block type 7 is a SystemInformationBlockType7, and
the system information block type 9 is a SystemInformationBlockType9.

11. An apparatus for wireless communication, comprising:
means for acquiring at least one non-required system information from a first eNodeB while in a radio resource control connected state after handover from a second eNodeB to the first eNodeB, the non-required system information being system information that is not required in the radio resource control connected state, but that is required in a radio resource control idle state; and
means for, during a transition period, transitioning from the radio resource control connected state to the radio resource control idle state without acquiring the at least one non-required system information, wherein the transition period is between release of the radio resource control connection state and successful transition to radio resource control idle state camped status.

12. The apparatus of claim 11, wherein the means for acquiring of the at least one non-required system information minimizes the transition period.

13. The apparatus of claim 11, further comprising means for using the at least one non-required system information.

14. The apparatus of claim 13, wherein the means for using the at least one non-required system information comprises means for minimizing a likelihood of going out of service through cell reselection based on the at least one non-required system information.

15. The apparatus of claim 14, wherein the cell reselection is an intra frequency reselection to a different frequency on a same carrier on the cell, the non-required system information comprising a system information type block 3 and a system information type block 4.

16. The apparatus of claim 14, wherein the cell reselection is an inter frequency reselection to a different carrier on the cell, the non-required system information comprising a system information type block 3 and a system information block type 5.

17. The apparatus of claim 14, wherein the cell reselection is inter radio access technology reselection to a different cell, the non-required system information comprising a system information type block 3, a system information block type 6, and a system information block type 7.

18. The apparatus of claim 11, wherein the radio resource control connected state is an RRC_CONNECTED state and the radio resource control idle state is an RRC_IDLE state.

19. The apparatus of claim 11, wherein the non-required system information comprises a system information block type 3, a system information block type 4, a system information block type 5, a system information block type 6, a system information block type 7, and a system information block type 9.

20. The apparatus of claim 19, wherein:
the system information block type 3 is a SystemInformationBlockType3,
the system information block type 4 is a SystemInformationBlockType4,
the system information block type 5 is a SystemInformationBlockType5,
the system information block type 6 is a SystemInformationBlockType6,
the system information block type 7 is a SystemInformationBlockType7, and
the system information block type 9 is a SystemInformationBlockType9.

21. A computer program product, comprising:
a non-transitory computer-readable medium comprising code for:
acquiring at least one non-required system information from a first eNodeB while in a radio resource control connected state after handover from a second eNodeB to the first eNodeB, the non-required system information being system information that is not required in the radio resource control connected state, but that is required in a radio resource control idle state; and
during a transition period, transitioning from the radio resource control connected state to the radio resource control idle state without acquiring the at least one non-required system information, wherein the transition period is between release of the radio resource control connection state and successful transition to radio resource control idle state camped status.

22. The computer program product of claim 21, wherein the code for acquiring of the at least one non-required system information minimizes the transition period.

23. The computer program product of claim 21, wherein the computer-readable medium further comprises code for using the at least one non-required system information.

24. The computer program product of claim 23, wherein the code for using the at least one non-required system information minimizes a likelihood of going out of service through cell reselection based on the at least one non-required system information.

25. The computer program product of claim 24, wherein the cell reselection is an intra frequency reselection to a different frequency on a same carrier on the cell, the non-required system information comprising a system information type block 3 and a system information type block 4.

26. The computer program product of claim 24, wherein the cell reselection is an inter frequency reselection to a different carrier on the cell, the non-required system information comprising a system information type block 3 and a system information block type 5.

27. The computer program product of claim 24, wherein the cell reselection is inter radio access technology reselection to a different cell, the non-required system information comprising a system information type block 3, a system information block type 6, and a system information block type 7.

28. The computer program product of claim 21, wherein the radio resource control connected state is an RRC_CONNECTED state and the radio resource control idle state is an RRC_IDLE state.

29. The computer program product of claim 21, wherein the non-required system information comprises a system information block type 3, a system information block type 4, a system information block type 5, a system information block type 6, a system information block type 7, and a system information block type 9.

30. The computer program product of claim 29, wherein:
the system information block type 3 is a SystemInformationBlockType3,
the system information block type 4 is a SystemInformationBlockType4,
the system information block type 5 is a SystemInformationBlockType5,
the system information block type 6 is a SystemInformationBlockType6,
the system information block type 7 is a SystemInformationBlockType7, and
the system information block type 9 is a SystemInformationBlockType9.

31. An apparatus for wireless communication, comprising:
a processing system configured to:
acquire at least one non-required system information from a first eNodeB while in a radio resource control connected state after handover from a second eNodeB to the first eNodeB, the non-required system information being system information that is not required in the radio resource control connected state, but that is required in a radio resource control idle state; and
during a transition period, transition from the radio resource control connected state to the radio resource control idle state without acquiring the at least one non-required system information, wherein the transition period is between release of the radio resource control connection state and successful transition to radio resource control idle state camped status.

32. The apparatus of claim 31, wherein the processing system is configured to acquire the at least one non-required system information from the cell while in the radio resource control connected state in order to minimize the transition period.

33. The apparatus of claim 31, wherein the processing system is configured to use the at least one non-required system information.

34. The apparatus of claim 33, wherein the processing system is configured to use the at least one non-required system information in order to minimize a likelihood of going out of service through cell reselection based on the at least one non-required system information.

35. The apparatus of claim 34, wherein the cell reselection is an intra frequency reselection to a different frequency on a same carrier on the cell, the non-required system information comprising a system information type block 3 and a system information type block 4.

36. The apparatus of claim 34, wherein the cell reselection is an inter frequency reselection to a different carrier on the cell, the non-required system information comprising a system information type block 3 and a system information block type 5.

37. The apparatus of claim 34, wherein the cell reselection is inter radio access technology reselection to a different cell, the non-required system information comprising a system information type block 3, a system information block type 6, and a system information block type 7.

38. The apparatus of claim 31, wherein the radio resource control connected state is an RRC_CONNECTED state and the radio resource control idle state is an RRC_IDLE state.

39. The apparatus of claim 31, wherein the non-required system information comprises a system information block type 3, a system information block type 4, a system information block type 5, a system information block type 6, a system information block type 7, and a system information block type 9.

40. The apparatus of claim 39, wherein:
the system information block type 3 is a SystemInformationBlockType3,
the system information block type 4 is a SystemInformationBlockType4,
the system information block type 5 is a SystemInformationBlockType5,
the system information block type 6 is a SystemInformationBlockType6,
the system information block type 7 is a SystemInformationBlockType7, and
the system information block type 9 is a SystemInformationBlockType9.

* * * * *